United States Patent [19]  [11] 4,437,978
Chester et al.  [45] Mar. 20, 1984

[54] CRACKING CATALYST COMPOSITIONS FOR REDUCTION OF SULFUR CONTENT IN COKE

[75] Inventors: Arthur W. Chester, Cherry Hill; Harry A. Mc Veigh, Belle Mead; William A. Stover, Woodbury, all of N.J.

[73] Assignee: Mobil Oil Corporation, New York, N.Y.

[21] Appl. No.: 374,454

[22] Filed: May 3, 1982

Related U.S. Application Data

[62] Division of Ser. No. 945,967, Sep. 26, 1978.

[51] Int. Cl.$^3$ .................. B01J 29/10; C10G 11/05; C10G 47/18
[52] U.S. Cl. .................... 208/120; 208/111; 502/73
[58] Field of Search .................. 208/120, 111

[56] References Cited

U.S. PATENT DOCUMENTS 3,930,987  1/1976  Grand .................. 208/111
4,115,251  9/1978  Flanders et al. .......... 208/120
4,137,151  1/1979  Csicsery ................ 208/120

Primary Examiner—Delbert E. Gantz
Assistant Examiner—O. Chaudhuri
Attorney, Agent, or Firm—Alexander J. McKillop; Michael G. Gilman; Charles J. Speciale

[57] ABSTRACT

A cracking catalyst composition co-impregnated with a combination of a rare earth oxide and with either chromium, manganese, cobalt, nickel or platinum group metals. Such catalyst compositions, when used in fluidized catalytic cracking processes, result in significant reductions of sulfur content in the coke produced thereby, in turn significantly reducing sulfur oxide (SO$_x$) emission in the regeneration stack gases.

9 Claims, No Drawings

CRACKING CATALYST COMPOSITIONS FOR REDUCTION OF SULFUR CONTENT IN COKE

This is a division of copending application Ser. No. 945,967, filed Sept. 26, 1978.

BACKGROUND OF THE INVENTION

1. Field of the Invention

This invention relates to cracking catalyst compositions suitable for use in fluidized catalytic cracking processes to reduce the emission of sulfur oxides ($SO_x$) in the regenerator stack gases.

2. Description of the Prior Art

Catalytic cracking is the major refinery process for the production of gasoline and distillate. About one-third of the total crude charged to United States refineries passes through the fluid catalytic cracking units. In that process fresh feed and recycle are mixed with regenerated catalyst at the bottom of the transfer line or riser reactor. During catalytic conversion, such as of high boiling hydrocarbons to lower boiling hydrocarbons, the reaction which takes place is accompanied by a number of complex side reactions, such as aromatization, polymerization, alkylation, and the like. As a result of these complex reactions, a hydrocarbonaceous deposit commonly called "coke" is laid down on the catalyst. This coke deposit deactivates the catalyst. The catalyst is then separated from the cracked products and drops to the stripper, where steam is injected to minimize the entrained hydrocarbons. The spent catalyst flows out of the stripper and is picked up with air for regeneration. In the regenerator, the carbon is burned off to restore catalyst activity. It is at this point that the sulfur in the coke is converted to $SO_2$ and $SO_3$ ($SO_x$) resulting in the important ecological need to control emissions of the same.

U.S. Pat. No. 3,556,988 describes the method of making a suitable base catalyst that can be used to prepare the novel catalytic cracking compositions of this invention. The former is a commercially manufactured catalyst containing REY crystalline aluminosilicate zeolite in a matrix consisting of 57% $SiO_2$, 2% $ZrO_2$ and 1% $Al_2O_3$.

SUMMARY OF THE INVENTION

In accord with the invention there has now been discovered a cracking catalyst composition co-impregnated with a combination of a rare earth oxide and with either chromium, manganese, cobalt, nickel or platinum group metals. The starting composition is preferably a commercially manufactured material containing REY or REX crystalline aluminosilicate in a suitable matrix. A suitable method for making the starting zeolitic compound is found in U.S. Pat. No. 3,556,988. The new cracking catalyst composites are employed in fluidized catalytic cracking units well known to the art and their use therein results in lowering of the sulfur content in the coke deposits produced on the catalyst material. This, very importantly, then reduces the $SO_2$ and $SO_3$ ($SO_x$) gases that result when the carbon is burned off to restore the catalytic activity of the catalyst. The new catalyst composites may also be employed in moving bed catalytic processes.

DESCRIPTION OF THE PREFERRED EMBODIMENTS

Suitable crystalline aluminosilicates for use in the composite catalysts of our invention are described in U.S. Pat. No. 3,140,249 as well as U.S. Pat. No. 3,140,253. Representative crystalline aluminosilicates suitable for the present invention include those natural and synthetic crystalline aluminosilicates having uniform pores of a diameter preferably between about 3 and 15 angstrom units. Such crystalline aluminosilicates include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979) and zeolite ZSM-12 (U.S. Pat. No. 3,832,449), synthetic mordenite, dealuminized synthetic mordenite merely to name a few, as well as naturally occurring zeolites including chabazite, faujasite, mordenite, and the like. Crystalline aluminosilicates having pore diameters between about 3 and 5 angstrom units may be suitable for shape selective conversion catalysis, while crystalline aluminosilicates having pore diameters between about 6 and 15 angstrom units are preferred by hydrocarbon conversion such as catalytic cracking and the like. Preferred crystalline aluminosilciates include the synthetic faujasite zeolite X and Y, with particular preference being accorded zeolite Y.

The crystalline aluminosilicate particles employed as a component in the catalyst compositions of the present invention are essentially characterized by a high catalytic activity.

This high catalytic activity may be imparted to the particles by base exchanging alkali metal aluminosilicate particles—either before or after dispersion thereof in the matrix—with a base-exchange solution containing ions selected from the group consisting of cations of elements of Groups IB-VIII of the Periodic Table, hydrogen, and hydrogen precursors, including mixtures thereof with one another. Hydrogen precursors, such as ammonia and ammonium salts, typically undergo, upon heating degradation to hydrogen cations in contact with aluminosilicates. Suitable methods of base exchange are described in the aforenoted U.S. Pat. No. 3,140,249 and 3,140,253.

Where an alkali metal aluminosilicate is employed initially, it is essential to base exchange either the aluminosilicate particles before or after compositing with the matrix to reduce the sodium content of the final product to less than about 4% by weight and preferably less than 1% by weight. The sodium content of the final composite is essentially less than 1% by weight. Such compositions provide high catalytic activity when zeolite Y or zeolite X is the crystalline aluminosilicate component. Preferably, however, and particularly when zeolite Y or X is the crystalline aluminosilicate component, the sodium content of the final composite should be less than 1% by weight.

As previously discussed, base exchange may be accomplished by one or more contacts (before and/or after incorporation of the crystalline aluminosilicate into the matrix) with a solution containing ions selected from the group consisting of cations of the elements of Groups IB-VIII, hydrogen and hydrogen precursors, including mixtures thereof with one another.

It is most preferred that the crystalline aluminosilicate be a rare earth zeolite, that is a crystalline aluminosilicate composition containing rare earth metal cations as a result of treatment with a fluid medium preferably a liquid medium, containing at least one rare earth metal cation. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto. The rare earth zeolite is preferably calcined prior to incorporation in the final composite.

Where a rare earth zeolite is desired, a wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, nitrates, formates, propionates, butylrates, valerates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, promethium, samarium, europium, gadolinium, terbium, dysoprosium, holmium, erbium, thulium, scandium, yttrium, and lutecium.

The rare earth metal salts employed can either be the salt of a single rare earth metal or mixtures of rare earth metals, such as rare earth chlorides or didymium chlorides. As hereinafter referred to, a rare earth chloride solution in a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45-56% by weight, cerium 1-2% by weight, praseodymium 9-10% by weight, neodymium 32-33% by weight, samarium 5-7% by weight, gadolinium 3-4% by weight, yttrium 0.4% by weight, and other rare earths 1-2% by weight. It is to be understood that other mixtures of rare earth are also applicable for the preparation of the novel compositions of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Rare earth zeolites for use in this invention may be made by base exchange of sodium zeolite X with rare earth ions to form rare earth zeolite X (see, e.g., U.S. Pat. No. 3,140,249, Example 26), and particularly preferred by base exchange of sodium zeolite Y with rare earth ions to form rare earth zeolite Y, in a similar manner.

The base catalyst used in one preferred embodiment of the invention contains REY in a silica-clay-zirconia matrix. It was found, in accord with the invention, that when a base catalyst is co-impregnated with a combination of rare earth oxide and with either $Cr_2O_3$, MnO, CoO or NiO, the sulfur content in coke produced during cracking is reduced by about 35-40%. The compositions that lead to the reduction of the sulfur content in coke comprise a base catalyst that:

(a) is impregnated with rare earth oxide at a level between about 1 and 10 wt percent above the exchange capacity of the base, preferably between 1 and 5 wt percent, (b) is co-impregnated with the rare earth oxide of (a) (described immediately above) and either $Cr_2O_3$, MnO, CoO or NiO, in amounts between about 0.05 and 5 wt percent preferably between about 0.1 to 2 wt percent, (c) is co-impregnated with rare earth oxide and a platinum group metal oxidation promoter in amounts between about 0.1 and 200 ppm, preferably between about 0.5 and 10 ppm.

The term "co-impregnated" is defined as impregnation of the rare earth and metals concurrently and not consecutively onto the base material.

In order to more fully illustrate the nature of the invention and the manner of practicing same, the following non-limitative examples are offered.

EXAMPLES 1-10

The base catalyst (Example 1) used in these studies was a commercially manufactured catalyst containing 10% REY in a matrix consisting of 57% $SiO_2$, 2% $ZrO_2$ and 1% $Al_2O_3$ that had been post-exchanged with rare earth chloride and contained 2.2 wt percent $RE_2O_3$. The method of manufacture has been detailed in U.S. Pat. No. 3,556,988.

The base catalyst was impregnated with a solution containing both rare earth chloride and an additional metal salt. The impregnation was performed with a volume of solution just sufficient to fill the catalyst pores. The rare earth chloride ($RECl_3.6H_2O$) had a rare earth distribution of 24% $La_2O_3$, 48% $CeO_2$, 5% $Pr_6O_{11}$, 17% $Md_2O_3$, 3% $Sm_2O_3$, 2% $Gd_2O_3$, 0.2% $Y_2O_3$ and 0.8% other oxides. The catalysts prepared, the impregnating salts and relevant analysis are given in Table 1. After impregnation, each catalyst was dried in air for 16 hours at 250° F.

Each catalyst was subsequently steam-treated for 4 hours at 1400° F. with 100% steam at 0 psig in a fluidized bed. The steamed catalysts were used to crack a high-sulfur gas oil, the properties of which are given in Table 2, in a fixed fluidized bed at 920° F., 3 C/O, 8.3 WHSV.

The product distributions obtained are given in Table 3. The percent sulfur in coke was determined by oxidizing the coke-containing spent catalyst in a stream of oxygen at about 1100° F. and passing the effluent gas through a 3% solution of hydrogen peroxide in water, thus converting $SO_2$ to $SO_3$ and absorbing all of the $SO_3$. The sulfate so formed was titrated as sulfuric acid with Standard base (NaOH).

TABLE 1

| Ex. No. | Metals Impregnated | Salts for Impregnation | | $RE_2O_3$, % wt | Metal or Metal Oxide Content |
|---|---|---|---|---|---|
| 1 | Base | — | — | 2.2 | 0 |
| 2 | $RE_2O_3$, $Cr_2O_3$ | $RECl_3.6H_2O$ | $Cr(NO_3)_3.6H_2O$ | 3.4 | 0.28% $Cr_2O_3$ |
| 3 | $RE_2O_3$, Mno | $RECl_3.6H_2O$ | $MnCl_2.4H_2O$ | 3.4 | 0.28% MnO |
| 4 | $RE_2O_3$, Pd | $RECl_3.6H_2O$ | $Pd(NO_3)_2$ | 3.6 | 0.02% Pd |
| 5 | $RE_2O_3$, Pt | $RECl_3.6H_2O$ | $Pt(NH_3)_4Cl_2$ | 3.1 | 0.5 ppm Pt |
| 6 | $RE_2O_3$, Pt | $RECl_3.6H_2O$ | $Pt(NH_3)_4Cl_2$ | 3.1 | 2 ppm Pt |
| 7 | $RE_2O_3$, MgO | $RECl_3.6H_2O$ | $Mg(NO_3)_2.6H_2O$ | 3.6 | 0.42% MgO |
| 8 | $RE_2O_3$, CoO | $RECl_3.6H_2O$ | $Co(NO_3)_2.6H_2O$ | 3.6 | 0.2% CoO |
| 9 | $RE_2O_3$, NiO | $RECl_3.6H_2O$ | $Ni(NO_3)_2.6H_2O$ | 3.4 | 0.125% NiO |
| 10 | $RE_2O_3$ | $RECl_3.6H_2O$ | | 3.5 | 0 |

TABLE 2

| High-Sulfur Gas Oil | |
|---|---|
| Gravity, °API | 23.4 |
| Sulfur, % Wt | 2.08 |
| Nitrogen, % Wt | 0.10 |
| Basic N, % Wt | 0.035 |
| Conradson Carbon, Wt. % | 0.28 |
| Hydrogen, % Wt | 12.1 |
| MW | 332 |
| Aniline Point, °F. | 161 |
| Bromine No. | 6.0 |
| R.I. @70° C. | 1.4900 |
| Sp. Grav., 60° F. | 0.9172 |
| Paraffins, % Wt | 21.3 |
| Naphthenes, % Wt | 27.8 |
| Aromatics, % Wt | 50.9 |
| $C_A$ | 17.3 |

TABLE 3

| | Example No. | | | | | | | | | |
|---|---|---|---|---|---|---|---|---|---|---|
| | 1 | 2 | 3 | 4 | 5 | 6 | 7 | 8 | 9 | 10 |
| Impregnated Metals | (Base) | $RE_2O_3$, $Cr_2O_3$ | $RE_2O_3$, MnO | $RE_2O_3$, Pd | $RE_2O_3$, 0.5 ppm Pt | $RE_2O_3$, 2 ppm Pt | $RE_2O_3$, MgO | $RE_2O_3$, CoO | $RE_2O_3$, NiO | $RE_2O_3$, |
| Conversion, % Vol | 69.2 | 68.4 | 68.4 | 64.3 | 67.0 | 68.9 | 62.2 | 65.9 | 61.4 | 68.9 |
| $C_5^+$ Gasoline, % Vol | 58.3 | 59.6 | 57.4 | 55.6 | 55.4 | 56.6 | 56.0 | 58.7 | 50.6 | 59.2 |
| Total $C_4$'s, % Vol | 11.5 | 11.5 | 9.6 | 9.7 | 12.5 | 13.8 | 9.3 | 9.5 | 8.3 | 12.7 |
| Dry Gas, % Wt | 6.8 | 6.0 | 5.4 | 5.6 | 6.4 | 6.5 | 5.2 | 5.5 | 6.0 | 6.4 |
| Coke, % Wt | 3.5 | 3.1 | 2.9 | 3.9 | 3.9 | 3.5 | 2.5 | 3.1 | 5.0 | 3.2 |
| Hydrogen, % Wt | 0.08 | 0.03 | 0.03 | 0.22 | 0.05 | 0.05 | 0.04 | 0.03 | 0.70 | 0.03 |
| $H_2S$, % Wt | 0.76 | 0.77 | 0.78 | 0.79 | 0.77 | 0.78 | 0.73 | 0.73 | 0.78 | 0.70 |
| % S in Coke (S/C × 100) | 3.9 | 1.8 | 1.9 | 2.5 | 2.3 | 2.5 | 2.0 | 2.4 | 2.1 | 2.8 |

Comparison of Example 1 with Example 2 shows that a substantial reduction of S in coke is obtained with a combination of $Cr_2O_3$ and rare earth. Thus, $SO_x$ emissions in this comparison are reduced by 60% and are combined with a substantial increase in gasoline yield. In the case of MnO (Example 3) or CoO (Example 8) combined with rare earth, reduction of $SO_x$ emissions are 60 and 45% respectively with little or no loss of gasoline yield. However, in both cases, catalyst stability is moderately reduced, as evidenced by the lower conversion after steaming.

The combination of platinum group metals with rare earth shows a substantial reduction of S in coke (Examples 4, 5, 6 vs Example 1). The use of such catalysts in combination with complete CO combustion regeneration in an FCC unit would result in both lower S in coke and lower Coke yields and therefore substantially lower $SO_x$ emissions.

Less desirable effects are observed for other metals. Thus, MgO (Example 7) reduces the S in coke, but this effect is accompanied by loss of stability. Nickel oxide (Example 9) also reduces S in coke, but substantially increases both hydrogen and coke yields.

It is to be noted that in all cases in which the S in coke is reduced, the $H_2S$ yield shows no increase, indicating that the S not incorporated in the coke remains in liquid products, probably the heavy cycle oil.

What is claimed is:

1. A cyclic fluidized catalytic cracking process, characterized by reduced emissions of sulfur oxides in regenerator stack gases, wherein a hydrocarbon feedstock containing organic sulfur compounds is subjected to cracking under fluidizing conditions with a high-activity fluid cracking catalyst in a reaction zone, cracking catalyst deactivated by coke deposits is separated from cracked hydrocarbon reaction zone effluent and regenerated to high activity in a catalyst regeneration zone by burning the coke deposits from the fluid catalyst in contact with an oxygen-containing gas stream, and regenerated fluid catalyst is recycled to the reaction zone, said process comprising the cracking of the hydrocarbon feedstock containing organic sulfur compounds in the presence of a regenerable fluid cracking catalyst, said cracking catalyst comprising a base cracking catalyst comprising a rare earth exchanged zeolite Y contained in a matrix therefor, co-impregnated with rare earth oxides, and a metal selected from chromium, manganese, cobalt, nickel and platinum group metals, said rare earth oxides being present in amounts between about 1 and 10 wt percent above the exchange capacity of said base material, said chromium, manganese, cobalt and nickel components being present in amounts between about 0.05 and 5 wt percent as the oxides, and said platinum group metals in amounts between about 0.1 and 200 ppm of metal.

2. A process according to claim 1 wherein chromium oxide is in combination with said rare earth oxides.

3. A process according to claim 1 wherein manganese oxide is in combination with said rare earth oxides.

4. A process according to claim 1 wherein cobalt oxide is in combination with said rare earth oxides.

5. A process according to claim 1 wherein a platinum group metal is in combination with said rare earth oxides.

6. A process according to claim 1 wherein nickel oxide is in combination with said rare earth oxides.

7. A process according to claim 5 wherein platinum is the group metal in combination with said rare earth oxides.

8. A process according to claim 1 wherein said rare earth oxides are present in amounts between 1 and 5 wt percent, above the exchange capacity of said base material, said chromium, manganese, cobalt and nickel components being present in amounts between about 0.1 and 2 wt percent as the oxides and said platinum group metals in amounts between about 0.5 and 10 ppm of metal.

9. A cyclic fluidized catalytic cracking process, characterized by reduced emissions of sulfur oxides in regenerator stack gases, wherein a hydrocarbon feedstock containing organic sulfur compounds is subjected to cracking under fluidizing conditions with a high-activity fluid cracking catalyst in a reaction zone, cracking catalyst deactivated by coke deposits is separated from cracked hydrocarbon reaction zone effluent and regenerated to high activity in a catalyst regeneration zone by burning the coke deposits from the fluid catalyst in contact with an oxygen-containing gas stream, under complete carbon monoxide combustion conditions, and regenerated fluid catalyst is recycled to the reaction zone, said process comprising the cracking of the hydrocarbon feedstock containing organic sulfur compounds in the presence of a regenerable fluid cracking catalyst, said cracking catalyst comprising a base cracking catalyst comprising a rare earth exchanged zeolite Y contained in a matrix therefor, wherein said base cracking catalyst is co-impregnated with rare earth oxides in amounts between about 1 and 10 wt percent above the exchange capacity of said base material and with a platinum group metal in amounts between about 0.5 and 10 ppm of metal.

* * * * *